US011976403B2

(12) United States Patent
Chiriatti (10) Patent No.: US 11,976,403 B2
(45) Date of Patent: May 7, 2024

(54) LAUNDRY TREATING APPLIANCE (71) Applicant: Electrolux Appliances Aktiebolag, Stockholm (SE)

(72) Inventor: Antonio Chiriatti, Schorndorf (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 331 days.

(21) Appl. No.: 17/621,480

(22) PCT Filed: Jun. 12, 2020

(86) PCT No.: PCT/EP2020/025278
§ 371 (c)(1),
(2) Date: Dec. 21, 2021

(87) PCT Pub. No.: WO2020/253988
PCT Pub. Date: Dec. 24, 2020

(65) Prior Publication Data
US 2022/0349104 A1 Nov. 3, 2022

(30) Foreign Application Priority Data

Jun. 21, 2019 (IT) .................. 102019000009690
Aug. 27, 2019 (IT) .................. 102019000015105

(51) Int. Cl.
*D06F 37/22* (2006.01)
*D06F 23/02* (2006.01)
(Continued)

(52) U.S. Cl.
CPC .............. *D06F 37/22* (2013.01); *D06F 23/02* (2013.01); *D06F 33/48* (2020.02); *D06F 33/76* (2020.02);
(Continued)

(58) Field of Classification Search
CPC .......... D06F 33/48; D06F 33/76; D06F 34/16; D06F 37/22; D06F 37/24; D06F 2103/24; D06F 2103/26
See application file for complete search history.

(56) References Cited

U.S. PATENT DOCUMENTS 1,902,193 A 3/1933 Stoddard
3,878,721 A 4/1975 Nath
(Continued)

FOREIGN PATENT DOCUMENTS

CN 101079569 A 11/2007
CN 101153456 A 4/2008
(Continued)

OTHER PUBLICATIONS

Chinese Office Action for Chinese Application No. 201880093598. X, dated Sep. 5, 2022 with translation, 19 pages.
(Continued)

*Primary Examiner* — Joseph L. Perrin
(74) *Attorney, Agent, or Firm* — Bradley Arant Boult Cummings LLP (57) ABSTRACT

A laundry treating appliance having a tub, rotatable drum, at least one transmitter coil, at least one ring shaped housing on the drum perimeter and having an annular channel therein and at least one balancing unit disposed in the channel. The balancing unit has a receiver coil configured to receive wireless power from the transmitter coil and an actuator powered by the receiver coil, a sensing element to detect a position of the balancing unit in the housing, a balancing control unit configured to control the positioning of the balancing unit by driving the transmitter coil to send power to the receiver coil to operate the actuator on a friction force element to change the friction between the housing and the balancing unit.

16 Claims, 4 Drawing Sheets (51) Int. Cl.
*D06F 33/48* (2020.01)
*D06F 33/76* (2020.01)
*D06F 34/10* (2020.01)
*D06F 34/16* (2020.01)
D06F 37/24 (2006.01)
D06F 103/24 (2020.01)
D06F 103/26 (2020.01)
H01F 38/14 (2006.01)
H02J 50/10 (2016.01)
H02J 50/40 (2016.01)

(52) U.S. Cl.
CPC .............. *D06F 34/10* (2020.02); *D06F 34/16* (2020.02); *D06F 37/24* (2013.01); *D06F 2103/24* (2020.02); *D06F 2103/26* (2020.02); *H01F 38/14* (2013.01); *H02J 50/10* (2016.02); *H02J 50/40* (2016.02)

(56) References Cited

U.S. PATENT DOCUMENTS

| | | |
|---|---|---|
| 5,318,705 A | 6/1994 | Pellerin |
| 5,813,253 A | 9/1998 | Uhlin |
| 8,336,338 B2 | 12/2012 | Cimetta et al. |
| 9,347,165 B2 | 5/2016 | Kim et al. |
| 9,951,465 B1 | 4/2018 | Herschler et al. |
| 11,168,430 B2 | 11/2021 | Park et al. |
| 2003/0061842 A1 | 4/2003 | Ryu et al. |
| 2004/0118168 A1 | 6/2004 | Woo et al. |
| 2004/0134094 A1 | 7/2004 | Hahn et al. |
| 2005/0097926 A1 | 5/2005 | Kim et al. |
| 2005/0210603 A1 | 9/2005 | Houser et al. |
| 2006/0081018 A1 | 4/2006 | Kim |
| 2007/0113595 A1 | 5/2007 | Harwood et al. |
| 2008/0053166 A1 | 3/2008 | Lim |
| 2008/0317688 A1 | 12/2008 | Doyle et al. |
| 2011/0154678 A1 | 6/2011 | Lee |
| 2011/0162224 A1 | 7/2011 | Bae et al. |
| 2012/0192362 A1 | 8/2012 | Lee et al. |
| 2013/0314897 A1 | 11/2013 | Dal Ben et al. |
| 2014/0355247 A1 | 12/2014 | Ius et al. |
| 2014/0366589 A1 | 12/2014 | Park et al. |
| 2015/0225887 A1 | 8/2015 | Schulze |
| 2015/0354123 A1* | 12/2015 | Kim ................ D06F 37/225 68/23.2 |
| 2015/0368845 A1* | 12/2015 | Kim ................ D06F 37/225 68/140 |
| 2016/0330572 A1 | 11/2016 | Kropp et al. |
| 2017/0096760 A1 | 4/2017 | Borlin et al. |
| 2017/0130382 A1* | 5/2017 | Kim ................ D06F 37/225 |
| 2018/0266030 A1* | 9/2018 | Kwon ................ H02J 50/12 |
| 2018/0291547 A1* | 10/2018 | Moon ................ D06F 37/225 |
| 2020/0263343 A1 | 8/2020 | Liu et al. |

FOREIGN PATENT DOCUMENTS

| | | |
|---|---|---|
| CN | 201047684 Y | 4/2008 |
| CN | 101400842 A | 4/2009 |
| CN | 201325442 Y | 10/2009 |
| CN | 103261506 A | 8/2013 |
| CN | 104131438 A | 11/2014 |
| CN | 104781462 A | 7/2015 |
| CN | 106245279 A | 12/2016 |
| CN | 106835621 A | 6/2017 |
| CN | 107541888 A | 1/2018 |
| CN | 107541905 A | 1/2018 |
| CN | 207812118 U | 9/2018 |
| CN | 109737073 A | 5/2019 |
| CN | 110318220 A | 10/2019 |
| DE | 4104450 A1 | 8/1992 |
| EP | 0351671 A1 | 1/1990 |
| EP | 0503999 A1 | 9/1992 |
| EP | 1167609 A1 | 1/2002 |
| EP | 2270272 A1 | 1/2011 |
| EP | 2302125 A1 | 3/2011 |
| EP | 2604740 A1 | 6/2013 |
| EP | 2719818 A1 | 4/2014 |
| EP | 2955263 A1 | 12/2015 |
| EP | 2990519 A1 | 3/2016 |
| EP | 3378982 A1 | 9/2018 |
| EP | 3388569 A1 | 10/2018 |
| EP | 3441512 A1 | 2/2019 |
| EP | 3594402 A1 | 1/2020 |
| FR | 2695657 A1 | 3/1994 |
| JP | 0433689 A | 2/1992 |
| JP | 2005021505 A | 1/2005 |
| JP | 2005177331 A | 7/2005 |
| JP | 2007159892 A | 6/2007 |
| JP | 2017127402 A | 7/2017 |
| KR | 100798779 B1 | 1/2008 |
| KR | 20130114482 A | 10/2013 |
| WO | 9000641 A1 | 1/1990 |
| WO | 2007063368 A1 | 6/2007 |
| WO | 2009061325 A1 | 5/2009 |
| WO | 2013022164 A2 | 2/2013 |
| WO | 2016182540 A1 | 11/2016 |
| WO | 2018045955 A1 | 3/2018 |
| WO | 2018091717 A1 | 5/2018 |
| WO | 2018184734 A1 | 10/2018 |
| WO | 2018236155 A1 | 12/2018 |
| WO | 2019223849 A1 | 11/2019 |
| WO | 2019223850 A1 | 11/2019 |

OTHER PUBLICATIONS

Korean Request for the Submission of an Opinion for Korean Application No. 10-20207032957, dated Sep. 17, 2022 with translation, 12 pages.
International Search Report and Written Opinion for International Application No. PCT/EP2020/053358, dated May 11, 2020, 9 pages.
International Search Report and Written Opinion for International Application No. PCT/EP2017/079819, dated Feb. 23, 2018—9 pages.
International Search Report and Written Opinion for International Application No. PCT/EP2018/063258, dated Feb. 4, 2019, 10 pages.
International Search Report and Written Opinion for International Application No. PCT/EP2019/081666, dated Feb. 13, 2020, 11 pages.
International Search Report and Written Opinion for International Application No. PCT/EP2019/081667, dated Feb. 5, 2020, 10 pages.
International Search Report and Written Opinion for International Application No. PCT/EP2019/081664, dated Feb. 5, 2020, 10 pages.
International Search Report and Written Opinion for International Application No. PCT/EP2018/063259, dated Feb. 5, 2019, 10 pages.
Chinese Office Action with Search Report for Chinese Application No. 201980102188.1, dated Apr. 26, 2023 with translation, 24 pages.
Chinese Office Action with Search Report for Chinese Application No. 201980103036.3, dated May 18, 2023 with translation, 21 pages.
English Translation of Chinese Office Action with Search Report for Chinese Application No. 202080052935.8, dated May 24, 2023, 14 pages.
Shao et al., "Mechanical Noise and Its Control, 1st Edition", Feb. 28, 1997, pp. 325-327, South China University of Technology Press.
International Search Report and Written Opinion for International Application No. PCT/EP2020/025278, dated Sep. 30, 2020, 15 pages.
Chinese Office Action with Search Report for Chinese Application No. 201980102232.9, dated Apr. 26, 2023 with translation, 28 pages.
Korean Request for the Submission of an Opinion for Korean Application No. 10-2020-7033385, dated Mar. 30, 2023 with translation, 19 pages.

(56) References Cited

OTHER PUBLICATIONS

Chinese Office Action with Search Report for Chinese Application No. 201880093070.2, dated Aug. 31, 2023 with translation, 21 pages.
Non Final Office Action for U.S. Appl. No. 17/777,121, dated Sep. 22, 2023, 20 pages.
Non Final Office Action for U.S. Appl. No. 17/777,124, dated Sep. 22, 2023, 19 pages.

* cited by examiner

LAUNDRY TREATING APPLIANCE

This application is a U.S. National Phase application of PCT International Application No. PCT/EP2020/025278, filed Jun. 12, 2020, which claims the benefit of Italian Application No. 102019000015105, filed Aug. 27, 2019 and Italian Application No. 102019000009690, filed Jun. 21, 2019, all of which are incorporated by reference herein.

BACKGROUND

The invention relates to a balancing system for a washer or dryer appliance to compensate for the unbalance created by a not uniform distribution of the laundry in the drum.

In general a washing machine includes a drum to be loaded with clothes and a motor to rotate the drum and perform a series of phases in a washing cycle such as washing, rinsing and spinning phases.

When the laundry is not uniformly distributed in the drum and a certain mass is concentrated in a part of the drum, during the rotation of the drum in the spinning phase, vibrations and noise occur due to eccentric rotation of the drum. If such eccentric rotation becomes severe, some parts of the washing machine, such as the drum, the bearings supporting the drum, or the tub may be damaged.

Normally to prevent the above listed damages an unbalance measurement check is implemented, that before spinning measures the unbalance level. In case of excessive unbalance the appliance control tries to better redistribute the laundry in the drum and, if after several attempts, the unbalance level is still too high, it performs the spinning at reduced rpm.

The unbalance has several negative effects on the customer satisfaction because of the generated noise and vibrations, the longer washing/drying cycle duration due to the re-balancing attempts and the poor drying performance when, in case of excessive unbalance level the spinning rpm speed is reduced.

Moreover the generated mechanical vibrations cause a significant stress to the mechanical structure reducing the appliance reliability that is partially compensated in the washer design by the use of bigger, more robust and expensive parts.

Therefore in the washing machine design it is beneficial the use of a balancer, which offsets unbalanced load generated from inside of the drum, to stabilize the drum rotation.

The known balancer systems make use of a balancer ring with a hollow space where are positioned some masses, typically spherical shaped that are free to move in the balancer ring. Often the balancer ring is filled with a fluid to limit the speed of the movement of the balancing masses. Even if this known balancer systems help to reduce the unbalance level they suffer of several drawbacks:

In washing at low rpm the masses are moving during the tumbling creating unbalance, noise and a resistant force to the washer motor.

In spinning the balancing process is very slow and complex, it may takes several minutes until the masses move to counter-balance the unbalance present in the drum.

In order to improve the balancing process active balancers are revealed for example EP 3378982 reveals a balancer with balancing unit receiving wireless power from a transmission coil provided at the tub. Being the transmission coil powered by a transmission converter under the control of a transmission controller to transmit sufficient wireless power to the balancing unit in a short period of time.

Also EP 2 955 263 and JP 2005 021505 reveal balancing units with motor/actuator wireless powered from a transmitter coil fixed to a stationary part of the appliance. EP3594402 discloses a washing machine provided with balancer masses that are actively movable and a control method thereof.

In these disclosures the action of gravitational or inertial forces cooperating with the friction force is not exploited, which is advantageously revealed in the present invention.

Moreover in the present invention it is exploited the action of one actuator means that by changing the friction force between the balance unit and the housing can change the balancing unit position. The actuator means can brake a balancing unit wheel or can contact directly one balancer housing side, while in the above mentioned inventions the mechanical motor/actuator have a mechanical gear interfacing the housing and the movement is obtained through mechanical work done by the actuator/motor.

WO2018/236155A1 discloses a wireless transfer link transferring power to balancing unit coil (310) from one transmitter coil (240) where the transmitter coil and the balancing coils have parallel winding axes. Same configuration is revealed in the already listed disclosures, in all of them, the wireless power transfer is possible only for limited time during the drum rotation. In the present invention the balancing unit receiver coil winding axis is perpendicular to the drum axis while the transmitter coil winding is parallel to the drum axis. The winding axis configuration between the receiver coil and the transmitter coil ensures a constant and efficient wireless power transfer during the drum rotation.

SUMMARY

Object of the invention is to provide a washer capable compensating for the unbalance generated by not uniform laundry distribution According to the invention there is a housing ring shaped having a hollow channel where are disposed balancing units. The housing ring shaped is fixed to the drum centered to its rotation axis. The balancing units positions in the ring can be remotely controlled by a balancing control unit positioned on a stationary part of the washer.

The balancing units remote positions control in the ring shaped hollow channel is done by actuator means in the balancing unit acting on a friction force element that can change the friction force between the balancing unit and the housing hollow channel. The actuator means are powered by receiver coils present in the balancing unit that receive wireless power from a transmitter coil.

The actuator means by changing the balancing unit friction force between the balancing unit and the housing channel can allow or block the balancing unit movements due to the action of the gravitational and/or inertial forces.

The gravitational force action, present in horizontal axis washers, acts on the balancing units during the drum rotation; while the inertial force can be generated by the drum rotation speed acceleration or deceleration or by the drum wobbling movement due to the drum unbalance.

The balancing control unit function operates under the supervision of the appliance control unit which manages the complete washer operation. Position detection elements provide to the balancing control unit the information about the balancing units positions. The position information is used together with the measurements from unbalance sensing elements providing information about the drum unbalance level and/or position to change the balancing units positions annulling the resulting drum unbalance. The unbalance measurements can be provided by the appliance control unit and/or it can be directly measured with additional unbalance sensing elements providing the washing unit movement amplitude and/or the drum unbalance position.

In the horizontal axis washers the balancing units during one drum rotation turn, under the action of the gravitational force, are pushed in half rotation period to move forward i.e. in the same direction of the drum rotation and in the other half period to move backward i.e. to move backward with respect the drum rotation period.

Similarly decelerating, respectively accelerating, the drum rotation speed the inertial forces act pushing to move the balancing unit forward with respect the drum rotation direction, respectively backward.

Therefore by reducing the balancing unit friction force, that normally blocks its movement in the housing channel, when the gravitational force or the inertial force are pushing in direction forward, respectively backward, it is possible to change its position forward, respectively backward.

The actuator means to change the friction force, are powered wireless from the magnetic coupling between the transmitter coil and the balancing units receiver coils.

The position configuration between the transmitter coil and balancing unit receiver coils ensures a constant magnetic coupling when the balancing unit moves in the hollow channel facing the transmitter coil winding.

In another advantageous embodiment the transmitter coil is wound parallel to the ring shaped housing and coaxial to the drum axis, wound centred around the drum axis. The balancing unit receiver coils winding axis is perpendicular to the drum axis and can be wound around ferrite cores to increase the magnetic coupling with the transmitter coil. To increase the received wireless power, more than one receiver coil can be foreseen in the balancing unit. The receiver coils in the balancing units form a resonant circuit and an impedance adaptation circuit maximises the power transferred to the actuator means.

In a first embodiment for a horizontal axis washer the housing ring shaped with two balancing units is fixed external to the drum, on its perimeter and the transmitter coil is fixed to the washer tub facing the balancing units housing.

The balancing units coils are part of a resonant circuit, setting different resonance frequencies for the balancing units, allows to select the balancing unit to be activated through a change of the transmitter coil wireless power transfer frequency.

The balancing units positioning is managed by the balancing control unit that also drives the transmitter coil, magnetically coupled to the balancing units coils. A detection coil is positioned on the tub perimeter close to the transmitter coil. When the drum rotates with the housing containing the balancing units, their coils generated magnetic field, induced by the transmitter coil, getting close to detection coil, induce a voltage output change in the detection coil allowing to detect the balancing units passage.

By knowing the detection coil position and the drum rotation speed the balancing control unit can calculate the balancing unit instantaneous positions. The drum rotation speed can be calculated as the time difference between two consecutive detections of the same balancing unit. Moreover the balancing control unit can tune the transmitter coil frequency to the balancing unit coils resonance frequency by maximising the associated detection coil voltage.

To change the position of one balancing unit, the balancing control unit drives the transmitter coil with the resonance frequency of the selected balancing unit, powering the actuators means to reduce the friction force when the gravitational or inertial force are acting to move it in the desired direction. By reducing the powering time the balancing control unit can limit the amount of position change.

The balancing unit is arc shaped fitting the housing circular profile. On the balancing unit side, closer to the drum axis, i.e. external in radial direction there is a wheel that normally is blocked by an electromagnetic actuator pin pushing on it. The wheel acts as a friction force element changing the friction force between the balancing unit and the housing.

In the spinning phase the drum is rotating at a speed ensuring that the laundry is satellized in the drum and the friction force between the braked wheel and the housing surface keeps the balancing unit braked at its position.

By powering the electromagnetic actuator the magnetic field retracts the actuator pin disengaging its braking function.

Advantageously, the wheel has a low rolling friction, that allows a low friction coefficient Cf for the balancing unit when it is free to rotate. Releasing the wheel brake changes the balancer unit friction from sliding to rolling allowing its movement on the balancer housing.

If the balancing unit can move under the action of the gravitational force, it moves on the housing side each drum rotation period forward and backward (with respect the drum rotation direction).

The forward and backward movements amplitudes depend on the drum rotation speed and the rolling friction force between the balancing unit and the housing.

By periodically powering the electromagnetic actuator that permits the wheel rotation, synchronised with the drum rotation, when the gravitational force acts pushing in the desired movement direction, it is possible to move in steps the balancing unit in the housing.

The effect of the inertial force associated to the drum axis movements due to the unbalance increases with the drum speed. When the drum rotation speed is higher than the washing unit resonance frequencies it acts moving the balancing unit in a direction opposite to the unbalance. Its balancing action is also used in the traditional ball balancers. In this case advantageously it will support the controlled balancing process driven by the reduction of the friction force when the gravitational force acts moving the balancing unit in direction opposite to the unbalance.

The actuator means braking function can be implemented in other embodiments as a pin acting on the wheel or as a brake plate like known, electromagnetic power on or power off brakes. The power off braking status can obtained by using springs or permanent magnets. The power off brake with permanent magnets uses them to attract an armature plate pushing it on a friction face braking the balancing unit wheel. To disengage the brake, power is applied to a coil which sets up an opposite magnetic field that cancels out the magnetic flux of the permanent magnets.

In another embodiment there is an electrically controlled clutch transferring mechanical torque to the wheel from a driving shaft. The driving shaft is part of a geared system driven by an actuator or motor with high reduction ratio. When the motor or actuator are not activated the driving shaft is practically blocked. The electrical controlled clutch acts normally as actuator means, braking the wheel when it is engaged, connecting it to the driving shaft or letting it free to rotate when the driving shaft is disengaged from the wheel. Activating the motor or actuator with the clutch in engaged condition the driving shaft torque is transferred to the wheel.

Advantageously at drum rotation speeds, where the wheel rolling friction force would brake the balancing unit movement, activating the actuator or motor part of the geared system with the proper timing and rotation direction selection, the driving shaft additional torque can support the gravitational and inertial forces action moving the balancing unit.

This embodiment advantageously extends the maximum drum rotation speed where it is possible to move the balancing units. The driving shaft can provide supporting torque to the balancing unit movements at the drum speed where the wheel rolling friction force would keep it braked independently from the status of the actuator means.

To minimise the wheel rolling friction coefficient it is possible to optimise its contact points profile with the balancer housing side that forms the wheel race. Additional actions ensuring low rolling friction are the selection of their building materials e.g. steel and a much higher mass for housing with respect the balancing units total mass.

Another embodiment could use actuator means made with a piezoelectric actuator that by changing its shape brakes the wheel.

One additional embodiment can use directly the actuator pin as friction element to change the friction force of the balancing unit with the housing. The pin, pushing directly against the housing side, can create a friction force braking the balancing unit movement in the housing.

A parking function keeps the balancing units at fixed positions in the housing also when the drum is rotating at low rpm in washing. This function is not strictly required to the laundry unbalance compensation that is done at rpm higher or equal than the satellization speed. However it is preferable having the balancing units blocked at low rpm avoiding similar drawbacks as in passive ball balancers e.g. noise.

The parking function foresees a movable parking mass with a pin supported by a spring that pushes the pin against the housing internal side having openings. When the drum is rotating at low speed, the balancing unit is sitting on the bottom. The pin that is pushing on the side when reaches the opening enters into it locking the balancing unit that start rotating with the drum. When it reaches the top, the gravitational force and the spring force move the parking mass to enter completely into the opening touching a ferromagnetic part. The magnetic force is enough to keep the parking mass in the opening creating a stable mechanical locking function between the balancing unit and the housing.

When the drum is accelerated, increasing the rotation speed and it is reached a speed that creates centrifugal force higher the magnetic force keeping the parking mass, it moves leaving the opening and unlocking the balancing unit movement. The action of the magnetic force is to ensure enough hysteresis to the parking function. Setting an enough big transition drum speed between the locking speed which can be in the range of 40-50 rpm and the unlocking speed that can be around 90-100 rpm.

It ensures a reliable operation avoiding unstable conditions.

Another embodiment uses a spring fixed to a mass pushing with the wheel the balancing unit against the housing opposite side ensuring at low speed drum speed enough friction force between the housing and the balancing unit that prevents its movement.

To minimise the cost and power consumption it can be foreseen different wireless power transfer levels from the transmitter coil to the balancing units coils. A higher level, very short, engaging or disengaging the actuator means braking function, an intermediate level keeping the brake engaged or disengaged and a low level, enough to detect the balancing unit passage by the detection coil.

It can be observed that in these embodiments the balancing control unit interface the balancing unit by driving the transmitter coil and reading the detection coil voltage.

In another embodiment in the balancing unit is included an accelerometer or a gravity force sensor that can be used among others to estimate its position, replacing the detection coil.

The acceleration vector component on the plan perpendicular to the drum rotation axis experienced by the balancing unit depends on its position with respect the unbalance. In a horizontal axis washer a periodical additional component of the acceleration is present that is associated to the gravitational force direction change during the drum rotation.

A microcontroller in the balancing unit can implement a simple wireless bidirectional communication protocol to transfer the acceleration sensor measurements to the balancing control unit.

If the housing ring shaped with the balancing units is fixed in the drum, the metal drum wall would prevent the magnetic coupling between the transmitter coil and the balancing unit receiver coils.

In this embodiment the transmitter coil is in the housing channel together with the two balancing units, it is wound in the channel, on one of his sides, with the winding wound center around the drum rotation axis. The balancing units coils are electromagnetically coupled to the transmitter coil, which is disposed in the housing channel. The transmitter coil is electrically connected to a supply coil positioned on the external side of the drum facing the tub.

An additional supply coil on the tub, facing the supply coil on the drum creates wireless power transfer link between them. The supply coil fixed to the tub transfer wireless power to the supply coil on the drum external side which is electrically connected to the transmitter coil in the channel which, in turn powers wireless the balancing unit coils.

BRIEF DESCRIPTION OF THE DRAWINGS

Other advantages and features of a balancing system for a laundry treating appliance, according to the present invention will be clear from the following detailed description, provided only as a non-limitative example, in which.

In the figures same parts are indicated with the same reference number.

DESCRIPTION OF EXEMPLARY EMBODIMENTS

Figure 1:
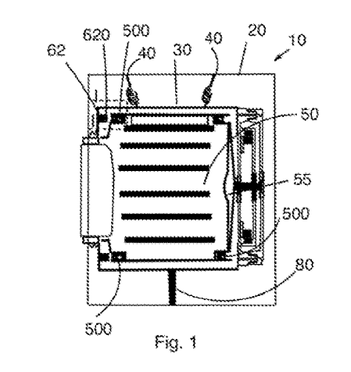
FIG. 1 is sectional view of a first possible embodiment of a horizontal axis washer with a balancing system object of this invention.

In FIG. 1 it is shown a sectional view of the key structural parts of a horizontal axis washer 10. In particular it is shown the wash unit consisting of the tub 30 on which is rotatably mounted a drum 50. The wash unit is suspended to the cabinet 20 through springs 40 and dumpers 80.

At the external perimeter of the drum 50 is fixed a housing ring shaped 500 facing a transmitter coil 620 fixed with a support element 62 to the tub 30.

Figure 2:
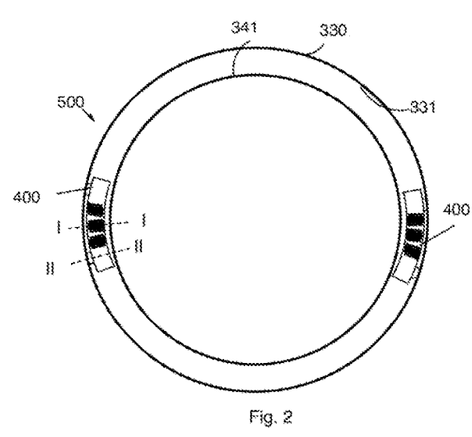
FIG. 2 is a front view showing the balancing units in the housing.

FIG. 2 shows a front view of the housing 500 channel internal content with internal sides in axial direction, parallel to the drum 50 axis, 331 and 341 where are disposed two balancing units 400.

Figure 3:
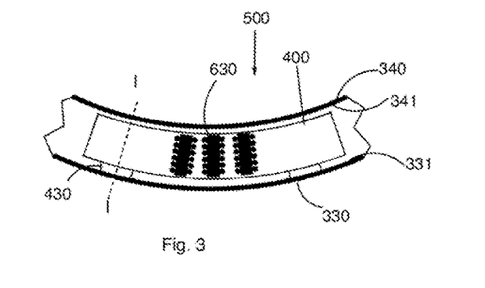
FIG. 3 is a detail view of FIG. 2.

FIG. 3 shows a detailed view of one balancing unit 400 in the housing (500). The balancing unit 400 has wheels 430 allowing it to move on the channel internal side 331 and it has three receiver coils 630 connected electrically in series and disposed parallel to the radial direction, i.e. perpendicular to the drum axis, facing the transmitter coil 620.

The balancing unit receiver coils 630 are wound around a cylindrical ferrite core extending in radial direction, perpendicular to the drum rotation axis. The projection of the transmitter coil 620 winding wires on the plan perpendicular to the drum rotation axis and passing through the balancing units receiver coil ferrite core axis it is centred with respect the receiver coil 630 dimensions in radial direction, maximising the magnetic coupling.

The position configuration between the transmitter coil 620 and the balancing unit receiver coils 630 ensures a constant magnetic coupling when the balancing unit 400 moves in the hollow channel facing the transmitter coil 620 winding.

Figure 4:
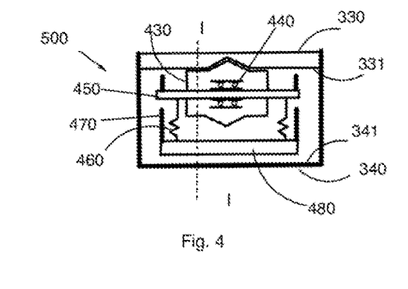
FIG. 4 is a sectional view according to the line I I of FIG. 3.

As shown in the sectional view of FIG. 4, taken along the line I I indicated in FIG. 3, the wheels 430 have a pointed shape moving on the channel housing side 331 race. They are fixed with low friction bearings 440 to a shaft 450. The shaft 450 is suspended with springs 460 to the balancing unit structure 480. When the drum 30 is rotating at its maximum speed the structure 480 is sitting directly on the housing side 331 avoiding to load the wheels 430 with the high centrifugal force acting on the balancing unit 400 mass.

The contact points profile between the wheel 430 and the housing side 331 that forms the wheel 430 race can be designed to minimise their rolling friction coefficient. Additional actions ensuring low rolling friction are the selection of their building materials e.g. steel and a much higher mass for the housing (500) with respect to the balancing units (400) total mass.

Figure 5:
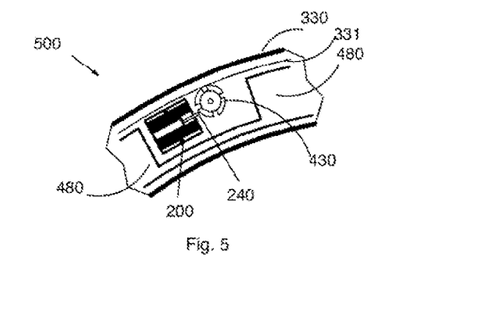
FIG. 5 is a sectional view according to the line I I of FIG. 4.

The wheel 430 has on one side openings, as shown in FIG. 5 sectional view in radial direction taken along the line I I of FIG. 4, where the pointed pin(s) 240 of an actuator 200 can enter. When the movable part 240 of the actuator 200, is in the extended position, its pin 240 interferes with the wheel 430 and blocks its movement, when it is retracted the wheel 430 is free to rotate.

Figure 6:
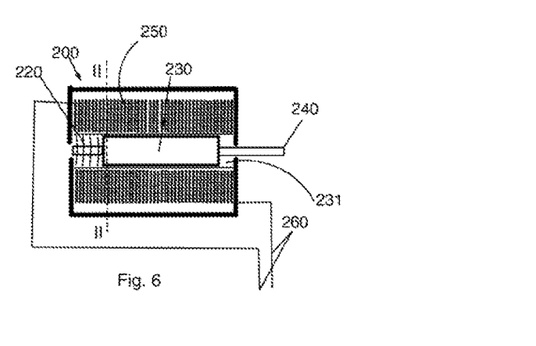
FIG. 6 is a sectional of a possible actuator means.

The actuator 200 shown in detail in FIG. 6 has a ferromagnetic cylinder 230 that can move in a guiding space 231 and it has the extension 240. A spring 220 keeps it in the extended condition. When voltage is applied to the winding 250 through the pin 260, the magnetic field acting on the ferromagnetic cylinder 230 move it pushing the spring and retracting the extension 240.

When the transmitter coil 620 transfers power to the receiver coils 630, it powers the actuator 200 retracting its extension 240 and enabling the balancing unit movement in the housing. In this condition the balancing unit can move on the housing side 331 with the wheels 430 under the action of the gravitational and/or inertial forces.

Figure 7:
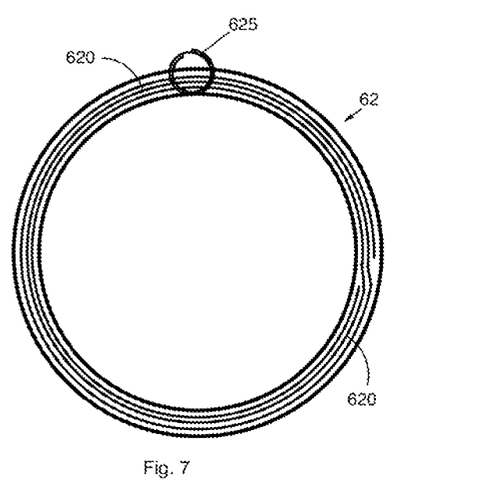
FIG. 7 is a front view of transmitter coil and detection coil.

FIG. 7 shows a front view of the transmitter coil 620 mounted on the support element 62. On the top there is a small radius coil 625 having a detection function to detect the balancing units 400 passage. The transmitter coil 620 has a radius comparable to the drum 50 diameter for example 40-60 cm while the detection coil radius can be for example 2-10 cm.

The detection coil 625 is positioned overlapping the transmitter coil 620 winding so that the induced voltage from the transmitter coil is minimal or in other words their net coupled flux is zero.

The magnetic coupling between the transmitter coil 620 and the balancing unit coils connected in series induces a current in each balancing unit coil 630. When one of the balancing units coils 630, during the drum 50 rotation, moves to the position corresponding to the detection coil 625, its electromagnetic field induces a voltage in the detection coil 625, allowing to detect the balancing units 400 passage.

The detection coil 625 winding axis is parallel to the drum axis f the transmitter windings. The transmitter coil 620 is wound centred with respect the drum 50 axis and it has a radial dimension with respect to the winding axis comparable to the drum radial dimension. The detection coil 625 dimension with respect its winding axis has a dimension comparable to the balancing units receiver coil 630 windings dimension in radial direction, perpendicular to the drum axis. The detection coil 625 can also have an oval shape extending the bigger dimension along the transmitter coil 620 perimeter. It is positioned on the transmitter coil 620 overlapping its winding. At its position, 12 o'clock, the gravitational force is aligned to the drum 50 acceleration force having opposite directions.

Figure 8:
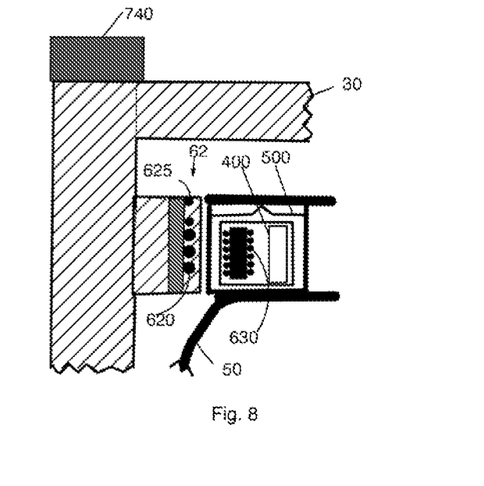
FIG. 8 is sectional view taken along the line I I of FIG. 1.

FIG. 8 shows a sectional view taken along the line I I of FIG. 1 where it is possible to see the flat transmitter coil winding 620 extending in radial direction, perpendicular to the drum 50 axis, together with the detection coil 625 winding. They are fixed with a support element 62 to the tub 30. The housing 500 is fixed on the drum 50 facing the transmitter coil 620. In the housing 500 there are the balancing units 400 with their coils 630. The coils 630 are wound around a ferrite core extending in radial direction, perpendicular to the drum axis. They are positioned with a distance from the drum axis to be centred with respect the transmitter coil winding wire 620 dimensions in radial direction, i.e. perpendicular to the drum axis.

The distance between the transmitter coil 620 and the receiver coils 630 in axial direction, with reference to the drum axis, can range between 1- to 3 cm.

Figure 9:
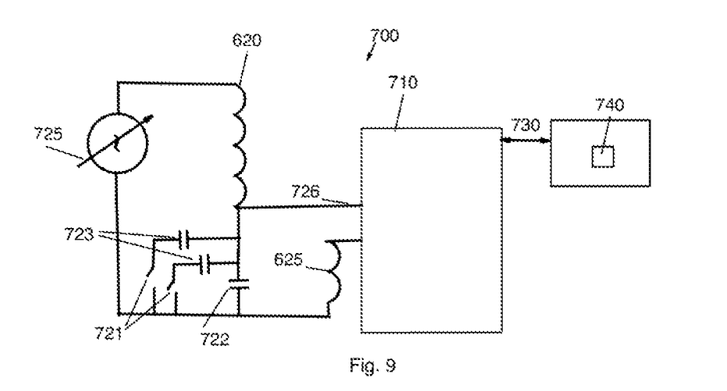
FIG. 9 shows an electric block diagram of the balancing control unit.

FIG. 9 shows a block diagram of the balancing control unit 700 with the transmitter coil 620 and the detection coil 625. Its control function 710 evaluate and changes the balancing units 400 positions to compensate for the unbalance present in the drum. The control function 710 operates under the supervision of the appliance control unit (not shown), it drives the transmitter coil 620 resonant circuit with the voltage generator 725 and reads the detection coil 625 input to evaluate the balancing units 400 positions. It communicates with the appliance control unit through an interface 730 exchanging information about the drum rotation speed and other information including the unbalance level and or position from an unbalance sensing element 740.

To change the transmitter coil 620 circuit resonance frequency, the resonant capacitance is formed with a fixed capacitor 722 and compensation capacitors 723 which are selected through switches 721 The balancing control unit 700 can change the transferred power and frequency to the balancing unit coils 630 by changing the voltage and frequency 725 driving the transmitter coil 620 and by changing the transmitter coil 620 circuit resonance frequency.

The balancing control unit 700 sets a low power level transfer, enough to supply the circuits in both balancing units 400 permitting the balancing units positions detection; a higher power level transfer is activated to move the balancing unit 400, enough to power one of the balancing units actuator 200. When operating at high power transfer mode it monitors the coil 620 current and voltage tuning the driving voltage frequency 725 to be close to the balancing units coils 630 resonance frequency. The tuning operation can be done by adjusting the wireless power transfer frequency to maximise the detection coil 625 induced voltage by the balancing unit transmitter coils 630.

In general the coil 620 resonant circuit frequency is set slightly higher than the balancing units coils 630 circuit resonance frequency in low power transfer mode and closer in case of high power transfer mode.

Moreover the voltage amplitude generated in the detection coil 625, when the high power level is transferred powering the actuator, provides information about the real voltage supplied to the actuator 200. This feedback information allows a compensation of losses due components tolerance in the wireless power link or even a possible linear control of the voltage or current supplying the actuator 200 in case a linear response type actuator is used.

Figure 10:
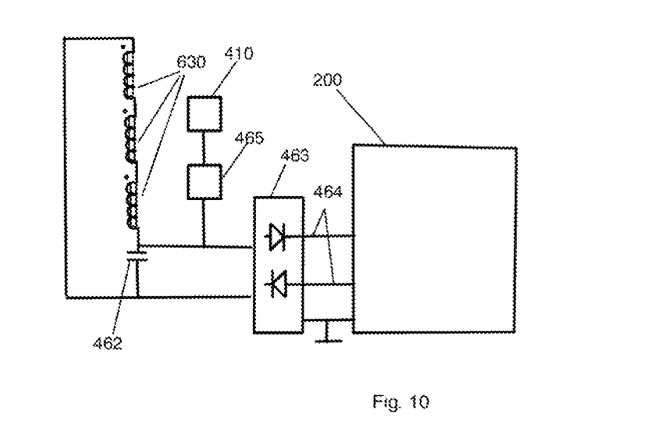
FIG. 10 shows an electric block diagram of the balancing unit.

FIG. 10 shows the functional block diagram of the electronics present in the balancing unit 400, receiving power from the coils 630 forming a resonant circuit with the capacitor 462 and driving the actuator 200. An interface block 463 performs the impedance adaptation function to maximise the power transferred. Moreover it rectifies and filters the impedance adapted voltage supplying the actuator 200.

Before going to spinning, the appliance control unit sets the drum 50 rotation speed to ensure the laundry satellization. In this condition it measures the unbalance level and or position using known methods, e.g. motor torque sensing algorithms or through accelerometers positioned on the washing unit, providing this information to the balancing control unit. The balancing control unit. 700 could also directly measure the washing unit movements with an accelerometer 740 fixed to the washer tub 30 as shown in FIG. 8. It can use the wash unit 30 movements amplitude as feedback signal about the drum 50 unbalance mass and position change.

If the unbalance level is too high, the appliance control unit activates the balancing process, managed by the balancing control unit 700, to change the balancing units 400 positions in the housing 500 to compensate for the unbalance in the drum 50.

Figure 11:
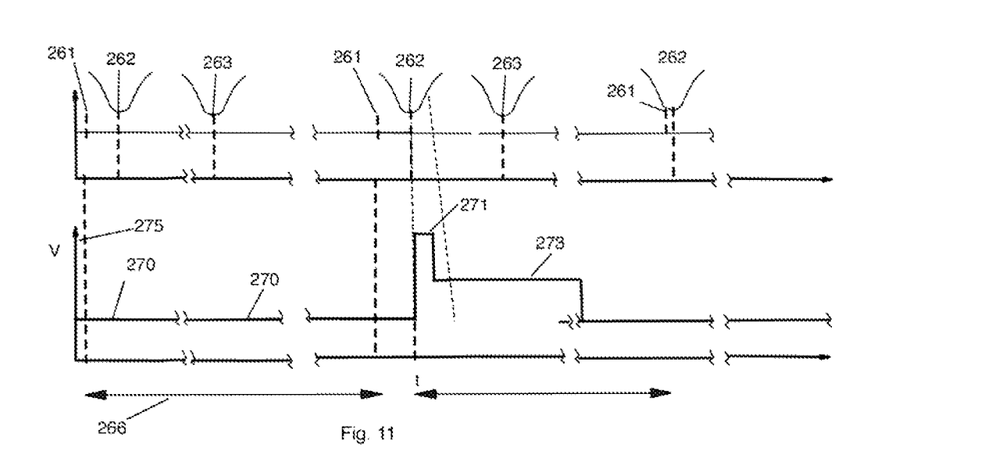
FIG. 11 shows on timing diagrams how the balancing control unit changes a balancing unit position.

In FIG. 11 it is shown on two timing diagrams how the balancing control unit 700 detects and changes the two balancing units 400 positions in the housing 500.

On the first time diagram are shown a periodic reference pulse 261 and the detection coil 625 pulses 262, 263 associated to the passage detection of the two balancing units 400. The pulse 261 repetition period is equal to the drum rotation period, it can be generated from the appliance control unit. It can also be generated internally in the balancing control unit 700 having measured the time difference between two consecutive voltage detections of one balance unit passage 262 or 263.

The time difference between the first balancing unit and the second balancing unit detections D divided by the drum rotation period T can give an estimate of the balancing units relative position P=D/T.

The balance unit 400 passage detections 262, 263, are generated from the voltage pulses induced by the coils 630 in the detection coil 625.

The balancing process is made maintaining constant the drum rotation speed. The balancing control unit 700 to perform the balancing units positions detection can transfer alternatively, each drum 50 rotation period, low wireless power at the two balancing units resonant frequencies. It maximises the detected voltage with minimal power consumption performing the positions detections on two consecutive drum turns.

The second time graph of FIG. 11 shows the power level transferred by the balancing control unit 700 through the coil 620. In the balancing process, the low power level transfer 270 is enough to power the balancing units 400 electronic circuits allowing their position detection function.

The high power level transfer characterised by an activation peak 271 followed by an holding level 273 it is used to release the actuator 200 braking function allowing the movement of the selected balancing unit 400.

The activation peak 271 provides enough power to move the actuator 200 ferromagnetic cylinder 230 while the holding level 273 provides the lower power needed to keep it retracted. This approach saves significant power consumption in the balancing control unit 700.

The balancing control unit 700 to change the position of one balancing unit 400 has to select its resonant frequency and with the proper activation timing can set the movement direction forward or backward with respect to the drum rotation direction.

As shown in FIG. 11, during the drum 50 rotation, the activation power 271 is done following the passage detection 262. Knowing the position of the detection coil 625, in this embodiment positioned at 12 o'clock, the balancing unit 400, under the action of the gravitational force, will move in the housing 500 forward, with respect the drum 50 rotation direction. By an activation delay of half drum rotation period, the movement would be backward with respect the drum 50 rotation direction.

The maximum balancing unit 400 movement in one drum turn is obtained maintaining the activation time 273 slightly more than half drum 50 rotation period, by reducing this time it is possible to reduce the amount of movement.

It can be observed that the balancing unit displacement in the half turn rotation depends on the rotation speed, the higher is the rotation speed the shorter is the gravitational force time of action resulting in a lower displacement.

In the following drum rotation period the balancing control unit 700 can evaluate the new position of the moved balancing unit 400.

During the high power transfer the not selected balancing unit will drain only a minimum power being the electromagnetic transferred power at a different frequency than its receiver coils resonance frequency.

The balancing units 400 position change can be done in steps every drum rotation period.

After having completed the desired balancing units position change the balancing control unit 700 asks the appliance control unit a new unbalance level check and if necessary it can execute a new balancing units position change in the channel.

The balancing unit movement due to the action of the gravitational force gets smaller by increasing the drum rotation speed. Depending on the balancing unit wheels 430 rolling friction coefficient with the balancing unit housing, getting positions changes above a certain critical speed, for example 400-600 rpm may be difficult. While the inertial force associated to the drum axis movements due to the unbalance may become significant with respect the gravitational force in this speed range. Moreover this inertial force associated to the drum wobbling movement, at speed above the wash unit 30 resonance frequency, acts moving the balancing units 400 away from the position of the unbalance.

It allows an extended balancing opportunity leveraging the unbalance inertial force to perform further controlled balancing steps above for example 500 rpm drum speed.

In fact, having balanced the drum, for example at 400 rpm, by further increasing the rotation speed the additional water extraction can cause a change in the laundry mass distribution generating unbalance. The inertial balancing force action is also used in the traditional ball balancers. In this case the big advantage it is constantly known the balancing units positions and it is possible to decide when to enable their movement.

In any case before going to the maximum spinning speed it is always possible a perfect drum 50 balancing executed at lower rpm speed where the rolling friction action allows the balancing units movement.

The same operation principle can be applied to change the balancing units position in a balancer housing 500 fixed to the perimeter of a vertical axis washer. In this case at low rpm the force acting to move the balancing unit is the inertial force generated by accelerating or decelerating the vertical axis drum rotation speed having properly released the balancing units movement.

Other embodiments use actuator means like standard power-on power-off brakes with a plate acting directly on the wheel 430 hub. The power-off spring type, very similar to the previous electromagnetic actuator has a coil and a pressure plate, braking the wheel hub 440, performing the function of the movable cylinder 230. When no electricity is applied to the actuator coil, there is a spring that pushes the plate against the wheel hub 430. When current is flowing in the coil a magnetic field attracts the plate releasing the clamping force braking the wheel hub 440.

Figure 12:
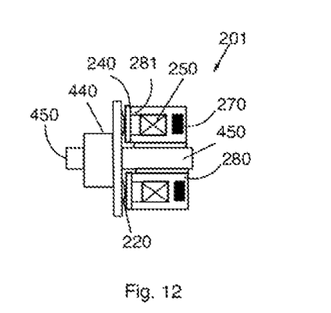
FIG. 12 shows another possible actuator means, a power-off brakes the magnetic type with permanent magnets.

The second embodiment for standard power-off brakes, the magnetic type 201, is shown in FIG. 12. In this embodiment the magnetic field lines generated by permanent magnets 270 attract the armature plate 240 pushing it on the outer pole friction face 281, braking the wheel hub 440 mounted on the shaft 450.

To disengage the brake, power is applied to the coil 250 which sets up an opposite magnetic field that cancels out the magnetic flux of the permanent magnets 270.

Figure 13:
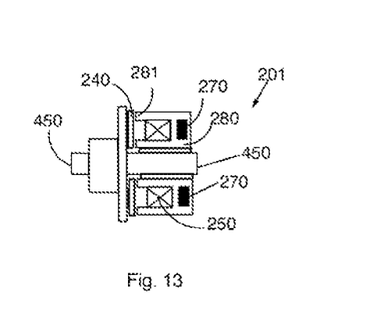
FIG. 13 shows the power-off brakes the magnetic type in a disengaged condition.

It releases the attraction force and the associated braking force and for example with diaphragm springs, the armature plate 240 is pulled away, as shown in FIG. 13, allowing the hub 440 to rotate freely. Permanent magnet brakes have advantageously a very high torque for their size, and by changing the coil 270 current offsetting the permanent magnetic flux it is also possible to implement a linear braking function.

In another embodiment there is an electrically controlled clutch transferring mechanical torque to the wheel 430 from a driving shaft. The driving shaft is part of a geared system driven by an actuator or motor with high reduction ratio. When the motor or actuator are not activated the driving shaft is practically blocked. The electrical controlled clutch acts normally as actuator means, braking the wheel 430 when it is engaged, connecting it to the driving shaft or letting it free to rotate when the driving shaft is disengaged from the wheel 430. Activating the motor or actuator with the clutch in engaged condition the driving shaft torque is transferred to the wheel 430.

Advantageously at drum 50 rotation speed where the wheel 430 rolling friction force would brake the balancing unit 400 movement, activating the actuator or motor with the proper timing and rotation direction selection, the driving shaft additional torque can support the gravitational and inertial forces action moving the balancing unit 400.

It allows to extend the maximum drum 50 rotation speed above the point where the wheel 430 rolling friction force would brake the balancing unit 400 movements even with the actuator means 200, 201 in disengaged status.

The power on power or power off electromagnetic brake 201 can be used as electrical clutch function if the braking armature plate 240 transfers the driving shaft torque pushing on the balancer wheel 430 hub.

The motor or actuator, part of the driving shaft geared system and the clutch activation are powered from the balancing units receiver coils.

Figure 14:
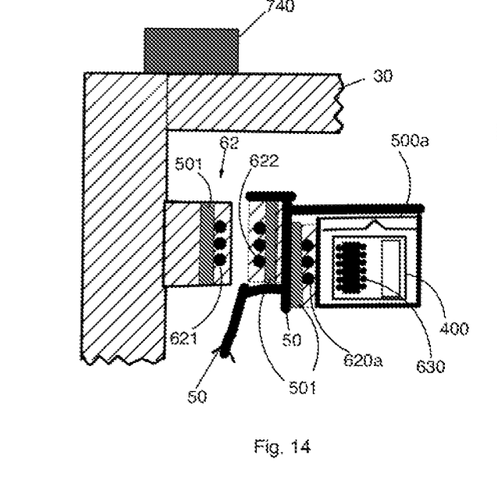
FIG. 14 is sectional view of another possible embodiment of a horizontal axis washer with a balancing system object of this invention.

In another embodiment shown in FIG. 14 the two balancer housings are positioned on the internal sides of the drum 50 perimeter. The transmitter coil 620a and 620b are positioned in the two balancer housing 500 together with the balancing units 400 improving their coupling factor with the balancing units coils 630. The coils 620a and 620b are electrically connected to the coil 622 fixed on the drum external perimeter which receives wireless power from the coil 621 fixed on the tub 30.

Ferrite shields 501 can be used to close the coils magnetic field reducing the power losses associate to the eddy currents induced on the drum 50 surface.

Figure 15:
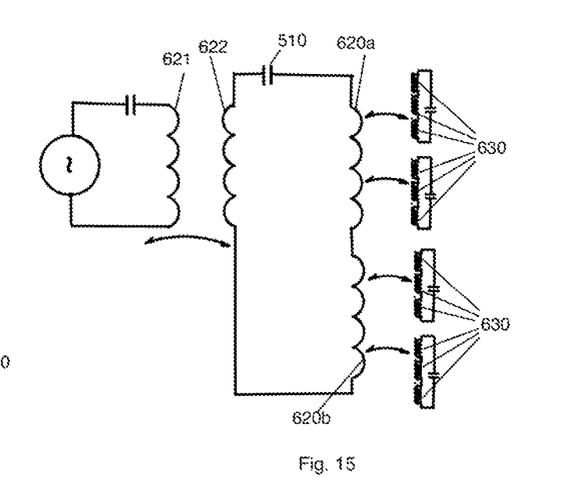
FIG. 15 shows the wireless power transfer scheme of the embodiment of FIG. 14.

The overall wireless power transfer scheme is shown in FIG. 15. The coil 621, fixed to the tub 30 with a support element 62, transfers electric power wireless to the intermediate coil 622. The intermediate coil 622 is electrically connected in series with the two transmitter coils 620a and 620b which are in the housings 500a, 500b, fixed to the drum 50 internal sides. A capacitor 510 can reduce the total impedance of the coils 622, 620a and 620b series.

To detect the balancing units 400 positions for a horizontal axis washer it can be used the gravitational force direction change measured in the balancing unit during the drum 50 rotation. The detection function can use an accelerometer 410 or inclinometer positioned in the balancing unit 400. In a vertical axis washer, it can be used as reference for the balancing units positions the acceleration measurements of the two acceleration components on the plan orthogonal to the drum axis. The angle formed of their resultant vectors on that plan is due to the drum wobbling effect of the unbalance and their angle can be correlated with their relative position. This contribution in a horizontal axis washer can be in a first approximation neglected with respect the gravitational force at low drum rpm. Moreover the use of three axis accelerometers in the balancing unit allows to get information about drum static and dynamic unbalance position.

The measurement data acquired by the sensors 410 positioned in the balancing unit 400 can be transferred via a wireless communication link 465 implementing a communication protocol between the control function in the balancing units 400 and the balancing control unit 700. The balancing balancing unit control function can be powered from the coils 630 and the wireless communication link 465 could use the same electromagnetic link transferring the wireless power. In this embodiment the balancing unit control function would be implemented with a microprocessor that could also drive directly the actuator 200,201 or a motor.

At low drum turning speed in washing, there is no practical centrifugal force pushing the balancing unit against the housing side 331. In this condition the gravitational force would keep the balancing unit on the housing bottom side during the drum rotation. To ensure a reliable operation it is preferred having the balancing units 400 continuously blocked in the housing 500 except when performing the balancing process. One embodiment to prevent their movement at low rpm is having the springs 460 pushing the balancing unit wheels 430 on the internal side 331 exercising a force between the internal sides 331 and 341. Increasing the drum rotation speed the acceleration force would push the balancing unit on the housing side 331 releasing the force acting on the housing internal side 341.

Figure 16:
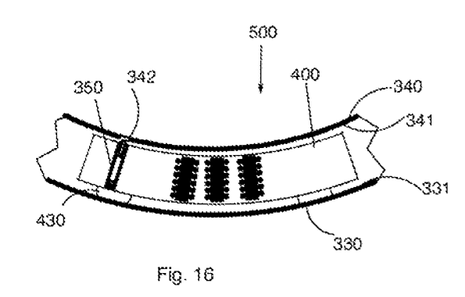
FIG. 16 shows a the detail view of a balancing unit with a parking element.

One other embodiment would use parking positions for the balancing unit creating openings 342 on the balancer housing internal side 341, that interact with parking elements 350, present in the balancing unit 400s. In the detail view of FIG. 16 is shown the balancing unit blocked at the parking position 342 by the parking element 350. The parking element 350 has an extension that can enter into the opening 342 creating a mechanical coupling between the balancing unit 400 and the housing 500 ensuring that they move together during the drum rotation.

Figure 17:
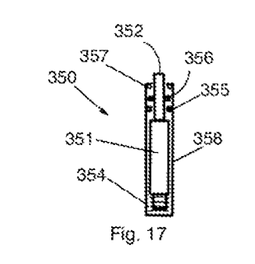
FIG. 17 shows a sectional view of a parking element.

FIG. 17 shows in detail a sectional view of the parking element 350 having a cylindrical shaped parking mass 351 that can move in a guiding housing 358. The parking mass 351 has a magnetic ring 356 that interacting with the magnetic field of a second magnetic ring 355 fixed to the housing 358 generates enough repulsive force keeping the parking element extended to enter into the opening 342.

Figure 18A:
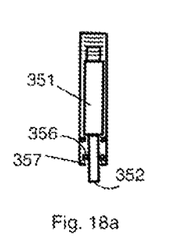
FIG. 18a and FIG. 18b show respectively the parking element in mechanical blocked condition and unblocked condition.

On one side of the parking mass there is a spring 354 that cooperating with the magnets repulsive force keeps the opposite pin 352 outside of the balancing unit 400 pushing against the sides 341. At low rpm when the balancing unit 400 is staying on the bottom side during the drum 50 rotation the parking mass extension 352 slides on the surface 341 until it reaches the opening 342 entering into it a creating the mechanical coupling with the housing. Once the balancing unit 400 is locked and transported up the gravitational force direction is aligned to the spring and magnetic force moving the parking mass 351 completely outside from the balancing unit 400 until it gets in touch to the ferromagnetic ring 357, as shown in FIG. 18a.

If the magnetic attractive force between the ferromagnetic ring 357 and the parking mass magnetic ring 356 is higher than the parking mass weight the parking mass will stay stably inside the opening 342.

Figure 18B:
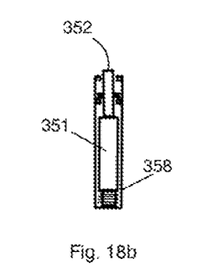

Increasing the drum rotation speed, at a certain drum speed, when the acceleration force plus the gravitational force will be higher than the magnetic force acting between the magnet 356 and the ferromagnetic ring, the parking mass 351 will be completely pushed back in the housing 358 as shown in FIG. 18b. releasing the mechanical block with the the housing 500. The parking element so designed introduces a response with hysteresis ensuring that there are non unstable conditions for the balancing units 400 when the drum speed increases to spinning in the transition from the blocked condition in parking position to the braked condition in spinning. It allows a design with 100% margins providing a reliable behaviour.

In fact if the total force spring magnetic repulsion mg is set to ensure the first locking with the parking mass m. The magnetic holding force between the ferromagnetic ring and the parking mass magnet can be set to be 2 mg. It will ensure with 100% margins that with a centrifugal acceleration 3 g the parking element is released. Assuming a 50 cm drum diameter it corresponds to approximately 95 rpm.

The balancing process can include the following steps:
- The drum rotation speed is set to a level that ensures the laundry satellization.
- With known methods the unbalance level and position are estimated by the appliance control unit. The unbalance information is transferred to the balancing control unit 700.
- A first low power transfer level 270 is activated in the transmitter coil 620, enough to evaluate the balancing units 400 positions by the detection coil 625 voltage pulses.
- Wireless power transfer at the resonance frequency of the selected balancing unit receiver coils is transferred with the proper timing to move it in the desired direction. The wireless power level consists of a higher power transfer 271, supplying the needed power for the desired motor/actuator 200, 201 activation followed by a lower holding power level 273.
- Return to the first low power transfer level 270 and new balancing units positions evaluation, if necessary a new balancing unit position change execution.

A possible balancing process can be done without knowing the unbalance position.

It is only need an information correlated to the unbalance level for example the wash unit movement amplitude, it comprises:
- The appliance control unit sets the drum rotation speed ensuring the laundry satellization in the drum.
- The wash unit movement amplitude is measured.
- One of the two balancing units 400 is moved in a first direction, if the unbalance level increases, then it is moved in the opposite direction until the wash unit movement amplitude is minimised.
- The two balancing units 400 are moved with respect the drum rotation direction one backward the other forward maintaining their distance, if the wash unit 30 movement amplitude increases, they are moved in the opposite directions until the washing unit 30 movement amplitude is minimised.

In this condition the balancing units 400 resulting balancing force is opposite and aligned to the unbalance present in the drum 50 due to the not uniform laundry.

The two balancing units 400 are moved to get closer or separated apart minimising further the washing unit 30 movement amplitude and the unbalance level.

If necessary the last two steps are repeated until the resulting unbalance in the drum 50 is canceled.

In general in the water extraction process, by increasing the drum 50 rotation speed, there will be a parallel continuous balancing process, starting from the laundry satellization speed, ensuring that defined unbalance levels or corresponding washing unit 30 movements amplitude levels are not exceeded.

Starting from the laundry distribution in the drum 50, the drum speed will be increased to get the laundry satellized.

The drum speed is further increased while adjusting the balancing units 400 positions properly activating the actuator means 200, 201 until the drum 50 speed has reached a rotational speed higher than the wash unit 30 resonance frequencies.

At speeds above the wash unit 30 resonance frequencies the inertial force support the balancing units 400 movement in direction away from the unbalance.

However above a certain drum 50 speed, the wheel 430 rolling friction force will brake the balancing unit 400 movements even if the actuator means 200, 201 is disengaged.

If the actuator means 201 is implemented as electrical controlled clutch engaging a driving shaft part of a geared motor or actuator driver, it can be activated supporting the gravitational and inertial forces action to move the balancing unit 400.

It can be observed that at high drum 50 rotation speed a large part of the water has been extracted and the drum 50 unbalance change due to the additional water extraction from the laundry is very limited. The compensation of small unbalance changes requires a limited position change for the balancing unit 400. The driving shaft based mechanical support can be designed to deliver to the wheel 430 a high torque with low rpm i.e. low balancing unit 400 movement speed, for example ranging between 0.1 to 0.8 cm/s.

Advantageously the driving shaft can be mechanically coupled to the actuator means 201 armature plate 240 allowing to support the action of the gravitational or inertial force when the rolling friction is predominant. While, being part of a motor or actuator part geared system, with significant reduction factor, when not transferring torque, it is practically blocked permitting the actuator means 201 braking action.

The invention claimed is:

1. A laundry treating appliance comprising:
a tub,
a drum rotatably mounted inside the tub to rotate about a drum axis;
at least one transmitter coil configured to supply wireless electrical power;
at least one ring shaped housing mounted centred to the drum on a perimeter of the drum, the at least one ring shaped housing having an annular channel defined therein;
at least one balancing unit disposed in the annular channel and free to move under action of gravitational and/or inertial forces, the balancing unit having:
at least one receiver coil configured to receive power wirelessly from the transmitter coil,
an actuator configured to receive the power from the receiver coil,
a friction force element operatively positioned between the actuator and the at least one ring shaped housing,
a sensing element configured to detect a position of the at least one balancing unit in the housing, and
a balancing control unit configured to drive the transmitter coil to control a position of the at least one balancing unit in the at least one ring shaped housing,
wherein the actuator when powered from the transmitter coil via the receiver coil acts on the friction force element to change a friction force between the ring shaped housing and the balancing unit, thereby effecting a movement of the balancing unit in the annular channel.

2. The laundry treating appliance of claim 1, wherein the balancing control unit is configured to drive the transmitter coil to control the position of the at least one balancing unit in the at least one ring shape housing based on one or more of: the position of the at least one balancing unit in the housing, an unbalance level of the drum, a drum position, and a drum speed.

3. The laundry treating appliance according to claim 1, wherein:
the transmitter coil comprises transmitter coil windings arranged around a transmitter winding axis that is coaxial to the drum axis; and
each at least one receiver coil comprises respective receiver coil windings arranged around a respective receiver coil axis that is perpendicular to and extends radially to the drum axis, and wherein a projection of the receiver coil windings in a direction of the drum axis overlaps the transmitter coil windings.

4. The laundry treating appliance according to claim 3, wherein the receiver coil windings and the transmitter coil windings are equidistant from the drum rotation axis in a direction radial to the drum rotation axis.

5. The laundry treating appliance according to claim 1, wherein the friction element comprises a balancing unit wheel, and the actuator is configured to change a braking force of the balancing unit wheel.

6. The laundry treating appliance according to claim 1, wherein the friction element comprises a portion of the actuator configured to push on one side of the housing.

7. The Laundry treating appliance according to claim 1, wherein the friction element comprises a balancing unit wheel, and the actuator comprises an electromagnetic brake having an armature plate configured to act on a hub of the balancing unit wheel.

8. The laundry treating appliance according to claim 7, wherein the friction element comprises a balancing unit wheel, and the actuator comprises an electrically-controlled clutch connecting a hub of the balancing unit wheel with a geared drive system.

9. The laundry treating appliance according to claim 1, wherein the friction element comprises a balancing unit wheel, and the actuator comprises an electromagnetic actuator having a pin configured to engage a side opening in the balancing unit wheel.

10. The laundry treating appliance according to claim 1, wherein the sensing element comprises at least one coil positioned on a stationary part of the appliance and configured to detect a voltage induced in the transmitter coil by the balancing unit receiver coil current.

11. The laundry treating appliance according to claim 1, wherein the sensing element comprises an accelerometer positioned in the balancing unit, and wherein the position of the at least one balancing unit is calculated by a direction of a gravitational force.

12. The laundry treating appliance according to claim 1, wherein the sensing element comprises a first accelerometer in a first balancing unit and the position of the at least one balancing unit in the housing is determined by a phase difference between a respective acceleration vector of the first accelerometer and a respective acceleration vector of a second accelerometer in a second balancing unit.

13. The laundry treating appliance according to claim 1, wherein the at least one receiver coil comprises a plurality of receiver coils configured to form a resonant circuit.

14. The laundry treating appliance according to claim 13, wherein a first balancing unit comprises at least one receiver coils configured to form a first resonant circuit having a first resonance frequency, and a second balancing unit comprises at least one receiver coil configured to form a second resonant circuit having a second resonance frequency, wherein the second resonance frequency is different from the first resonance frequency.

15. The laundry treating appliance according to claim 1, wherein the transmitter coil is configured to transfer at wireless electrical power at at least two different power levels.

16. A method to control a laundry treating appliance comprising a tub, a drum rotatably mounted inside the tub to rotate about a drum axis, at least one transmitter coil configured to supply wireless electrical power, at least one ring shaped housing mounted centred to the drum on a perimeter of the drum, the at least one ring shaped housing having an annular channel defined therein, and at least two balancing units disposed in the annular channel and free to move under action of gravitational and/or inertial forces, wherein each balancing unit has at least one receiver coil configured to receive wireless power from the transmitter coil, wherein the two balancing units receiver coils are configured to resonate at different frequencies, and each has an actuator that, when powered from the transmitter coil, acts on a friction force element to change a friction force between the ring shaped housing and the balancing unit enabling or braking the balancing unit movement in the annular channel, a sensing element configured to detect the position of the balancing units in the housing, a balancing control unit configured to manage the positioning of the at least one balancing unit and to drive the transmitter coil based on the positions of the at least two balancing units, the unbalance level and or position estimated by a sensing element and the drum speed, the method comprising:
rotating the drum at a constant speed that is higher than a predetermined laundry satellization speed to thereby brake the balancing units in the housing by friction between the friction force elements and the housing;
estimating the balancing units positions from the sensing element detection times or phase difference and the drum rotation period; and
moving one balancing unit forward or backward with respect the drum rotation direction, by operating the balancing control unit to reduce the friction force with the housing by transferring wireless power at the selected balancing unit receiver coils resonance frequency to power its actuator means, when its instantaneous speed component parallel to the gravitational force, during the drum rotation has the same direction of the gravitational force or opposite direction.

* * * * *